United States Patent
Duellman et al.

(10) Patent No.: US 10,821,562 B1
(45) Date of Patent: Nov. 3, 2020

(54) CONE HEAD WIPER REPLACEMENT METHOD AND APPARATUS

(71) Applicant: McCloskey International Limited, Keene (CA)

(72) Inventors: Dennis Duellman, Keene (CA); Andy Krol, Keene (CA)

(73) Assignee: McCloskey International Limited, Keene (CA)

( * ) Notice: Subject to any disclaimer, the term of this patent is extended or adjusted under 35 U.S.C. 154(b) by 34 days.

(21) Appl. No.: 16/441,434

(22) Filed: Jun. 14, 2019

(51) Int. Cl.
| B23P 11/02 | (2006.01) |
| B02C 2/00 | (2006.01) |
| B23P 6/00 | (2006.01) |
| B23P 11/00 | (2006.01) |

(52) U.S. Cl.
CPC .............. B23P 11/025 (2013.01); *B02C 2/00* (2013.01); *B02C 2/005* (2013.01); *B23P 6/00* (2013.01); *B23P 11/005* (2013.01); *B23P 11/02* (2013.01); *Y10T 29/4973* (2015.01); *Y10T 29/49719* (2015.01); *Y10T 29/49721* (2015.01)

(58) Field of Classification Search
CPC ... B02C 2/00; B02C 2/005; B23P 6/00; B23P 11/005; B23P 11/02; B23P 11/025; Y10T 29/49719; Y10T 29/49721; Y10T 29/4973
See application file for complete search history.

(56) References Cited

U.S. PATENT DOCUMENTS

| 2,787,426 | A |   | 4/1957  | Roubal  |              |
|-----------|---|---|---------|---------|--------------|
| 3,534,916 | A | * | 10/1970 | Decker  | B02C 2/005   |
|           |   |   |         |         | 241/285.1    |
| 3,536,268 | A | * | 10/1970 | Adam    | B02C 2/005   |
|           |   |   |         |         | 241/293      |
| 3,583,649 | A | * | 6/1971  | Adam    | B02C 2/005   |
|           |   |   |         |         | 241/293      |
| 4,629,197 | A | * | 12/1986 | Schutte | B02C 2/04    |
|           |   |   |         |         | 277/419      |
| 4,919,349 | A | * | 4/1990  | Johnson | B02C 2/04    |
|           |   |   |         |         | 241/215      |
| 5,080,294 | A | * | 1/1992  | Dean    | B02C 2/005   |
|           |   |   |         |         | 241/207      |
| 5,184,389 | A |   | 2/1993  | Dean    |              |
| 5,996,916 | A | * | 12/1999 | Musil   | B02C 2/047   |
|           |   |   |         |         | 241/215      |

(Continued)

FOREIGN PATENT DOCUMENTS

EP 3132851 2/2017
GB 550540 A * 1/1943 ............ B02C 2/005

*Primary Examiner* — Jermie E Cozart
(74) *Attorney, Agent, or Firm* — Schwabe, Williamson & Wyatt, P.C.

(57) ABSTRACT

Embodiments provide a method for removably mounting at least one wiper ring to the underside of a cone head of a cone crusher. The method includes the following steps in the order recited: inducing a temperature difference between the cone head and the at least one wiper ring; mounting the at least one wiper ring to an underside of the cone head while maintaining the temperature difference; and holding the at least one wiper ring against the underside of the cone head while the temperature difference dissipates. The temperature difference may be induced by either cooling the at least one wiper ring or by heating the cone head, or both.

8 Claims, 2 Drawing Sheets

(56) References Cited

U.S. PATENT DOCUMENTS

| | | | |
|---|---|---|---|
| 2004/0035967 A1* | 2/2004 | Johnson | B02C 2/04 241/207 |
| 2008/0041995 A1* | 2/2008 | Hall | B02C 2/005 241/207 |
| 2012/0006918 A1* | 1/2012 | Belotserkovskiy | B02C 2/04 241/25 |

* cited by examiner

CONE HEAD WIPER REPLACEMENT METHOD AND APPARATUS

TECHNICAL FIELD

Embodiments herein relate to the field of cone crushing, and, more specifically, to wiper seals used in the underside of a crushing cone.

BACKGROUND

Rock crushers reduce the size of rocks in order to provide material for road beds, concrete, building foundations and the like. By definition, rock crushers need to be heavy duty to avoid breakage and bending during the crushing process. Rock crushers may be categorized as cone crushers, jaw crushers, and impact crushers, but this disclosure will focus on cone crushers. Cone crushers break up rocks and other hard material by squeezing or compressing product between convex and concave-shaped surfaces covered by hardened wear surfaces. Cone crushers are normally used as the second or third stage crusher, with a reduction ratio of from about 6 to 8 to 1.

The present disclosure describes a cone crusher that is conventional in much of its construction. It includes a conically-shaped head, which is part of an upper rock crusher assembly. The conical head gyrates or oscillates relative to a stationary bowl that includes a hardened bowl liner. The spacing between the bowl liner and the cone at any given point opens and closes as the cone oscillates relative to the bowl. Rocks are deposited in the spacing. They slide down between these surfaces as the space opens, and the rocks are crushed as the space closes.

Conventional cone crusher heads have an underside that includes a plurality of (usually two) so-called wipers or wiper rings in the form of rings that are typically cast or machined into the cone. Lubrication is provided to the underside of the cone to reduce the friction between the cone head and the stationary components. The function of these wiper rings is two-fold: an inner wiper ring seals oil from leaking out from the cone head into the crushing space; and an outer wiper prevents debris from the crushing space entering the cone chamber and fouling the lubricating oil.

While the cone and the wiper rings cast therein are typically formed of hardened steel, the wiper rings nonetheless wear down due to the harsh operating conditions and the abrasiveness of the rock dust and other debris that, without the wiper rings, would enter the underside of the cone head. This wear will, over time, permit oil to leak from the inner area and permit debris to pass into the inner area. This may detract from the performance of the crusher and may result in the crushing head and other components having to be prematurely replaced.

It is possible to replace the wiper rings before discarding and replacing the entire cone. This is done by cutting the wiper rings off of the underside of the cone, using a cutting torch. Then, new wiper rings are welded in place where the original rings were disposed.

While this wiper ring replacement operation is often successful in extending the life of a crushing cone, the process is difficult, and needs to be performed in a factory setting by a highly skilled worker. And even in that setting, it is very difficult to position the rings precisely where they need to be to perform the sealing function.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
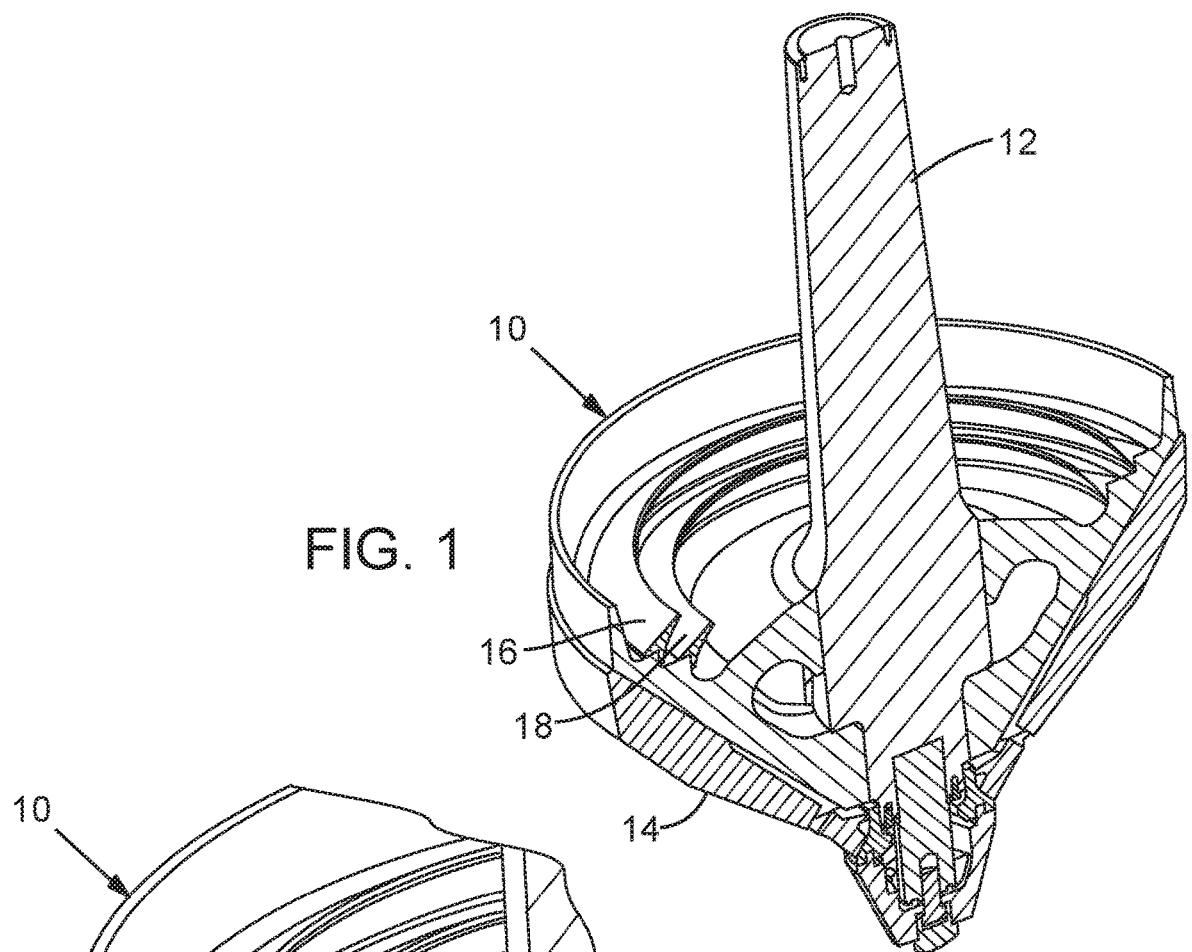
FIG. 1 is a sectional view of in inverted cone head of a cone crusher, showing two wiper rings mounted to the underside of the cone head.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments disclosed herein provide a method for replacing the wiper rings in a cone crusher that does not involve cutting and then welding in place replacement rings. Specifically, the present disclosure involves casting or machining the inner portion of the cone without forming the wiper rings. Instead, the cone may be shaped with peripheral formations designed to receive the inner side of removable and replaceable wiper rings. Inducing a temperature difference between the cone and the wiper rings facilitates expansion of the cone or the contraction of the rings or both, to permit the rings to be securely mounted in place. When the rings need to be replaced, the rings are cut into a plurality of pieces and removed from the cone. Alternatively or additionally, a temperature difference may again be induced between the cone and rings prior to removal.

Figure 4:
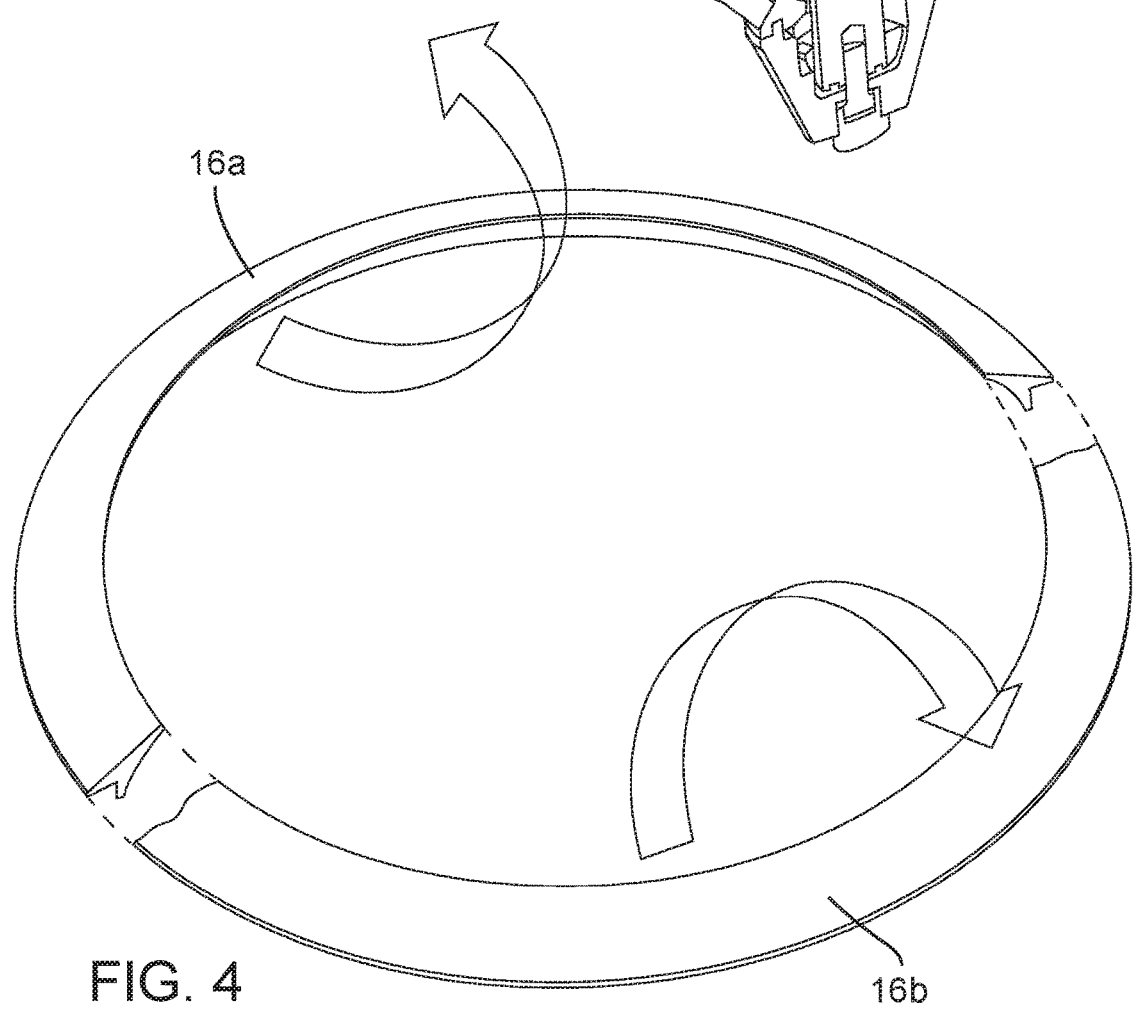
FIG. 4 is a schematic perspective view showing how the two cut pieces of the wiper rings can be removed.

The rings are typically cut using an angle grinder and a thin cutting disc. A preferred method is to make two cuts in each ring, 180 degrees apart, as shown in FIG. 4. The rings can then be pried from the cone. This operation is far easier than cutting the rings from the cone of which they are a formed part, as was necessary following prior art practices.

There are many advantages the disclosed process has over the prior art practices. First, there is no need to remove the cone to a remote location as will often be necessary in order to cut the existing wiper rings from the cone. Attempting to perform this process on site might create a risk from toxic fumes, which are a serious problem in underground mines or closed factory settings.

Another advantage of the disclosed process is that without having to weld the replacement rings in place, coatings such as Armoloy® chrome coating can be applied to the wiper rings prior to installation. Such coatings can sometimes increase the life of wiper rings by as much as 50%. Welding operations used to install replacement wiper rings following prior art practices could damage Armoloy or other coatings used to protect the wiper rings from corrosion and extend the life of the rings.

A method may be provided for removably mounting at least one wiper ring to the underside of a cone head of a cone crusher, comprising the following steps in the order recited: inducing a temperature difference between the cone head and the at least one wiper ring; mounting the at least one wiper ring to an underside of the cone head while maintaining the temperature difference; and holding the at least one wiper ring against the underside of the cone head while the temperature difference dissipates.

A more specific method for mounting the replaceable wiper rings involves cooling the wiper rings and then mounting them to peripheral formations. The rings may be cooled by using dry ice, liquid nitrogen or some other conventional cooling system. The cold wiper rings are held against the peripheral formations and once the mounted rings warm to room temperature, they will be securely fastened to the underside of the cone. Then, to remove and replace the worn wiper rings, the rings pried out of the cone, normally after being cut into a plurality of pieces. The replacement wiper rings cone are then cooled and held in place against the peripheral formations. Once the rings warm to room temperature, they will expand and will be secured in position. The advantage of this process is that heating the cone may be difficult on site so removal of the cone to a factory site or machine shop may be necessary. Use of the cone-heating process can result in the equipment being off line longer than desirable, and would ordinarily involve additional expense at the factory or machine shop.

Another more specific method for mounting the replaceable wiper rings involves heating the cone head using a torch, placing the cone in an oven, or by some other conventional heating means. When the cone is still hot, the wiper rings are mounted to the peripheral formations. The rings are held securely in place and the cone is allowed to cool. This causes the cone to contract, securely fastening the wiper rings in position. Then, to remove and replace the wiper rings, the worn wiper rings are typically cut into a plurality of pieces and removed. The cone is then heated, and replacement wiper rings are held against the peripheral formations. Once the cone cools, it will contract to secure the rings in position.

Another method for removably mounting replaceable wiper rings involves both heating the cone and cooling the wiper rings. After heating the cone and cooling the wiper rings, the rings are mounted in position and held against the peripheral formations. The cone and the wiper rings are then permitted to cool and warm to room temperature, respectively, thus securing the replaceable rings in position. Then, to replace the worn rings, the rings are pried from the cone, normally after being cut into a plurality of pieces. The cone is then heated while replacement rings are cooled, and the cooled replacement rings are held against the peripheral formations as the cone and the rings are permitted to cool and warm, respectively, to secure the replacement rings in position.

It may be that in certain situations only one of the wiper rings needs to be replaced. In most cases this will be the outer wiper. One advantage of the described process is that the second wiper may sometimes be damaged during the conventional cutting operation to remove a first wiper ring. With the disclosed process, such damage would not occur, and either ring may be removed without damage to the other.

Another way to describe the present disclosure is as a cone crusher including a cone head having an underside, at least one peripheral formation extending around the periphery of the underside of the cone head, and a wiper ring removably mounted to the at least one peripheral formation. The peripheral formation may include a male ridge of about 90 degrees, with the wiper ring having an underside with a female slot complementing the male ridge in the peripheral formation.

Figure 2:
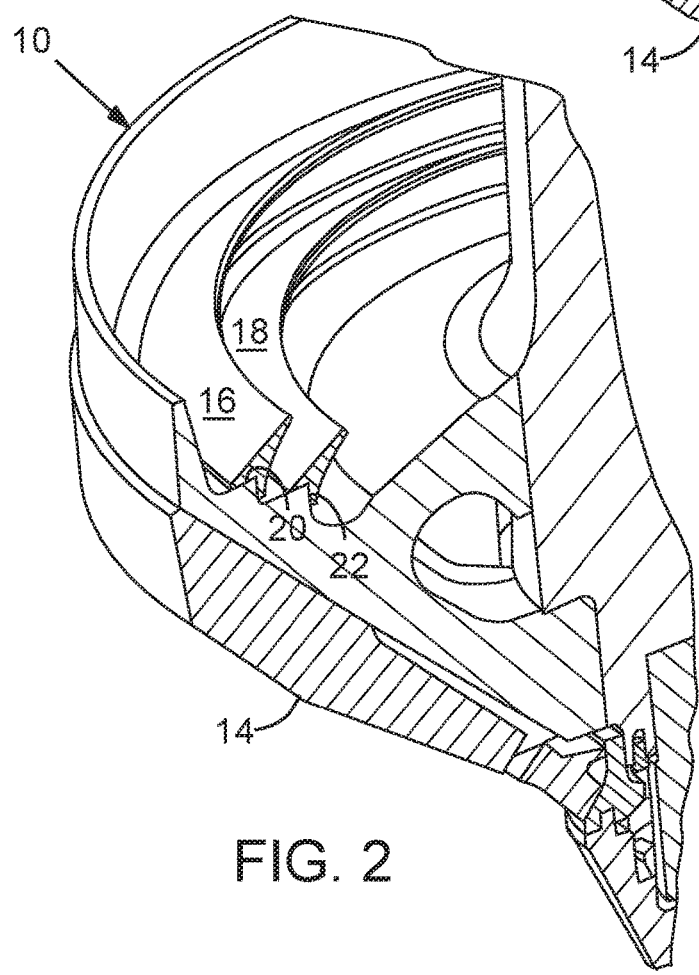
FIG. 2 corresponds to FIG. 1 but is fragmentary and enlarged, showing a mounting of the wiper rings to peripheral formations.

FIG. 1 shows an inverted cone head 10, a cone head shaft 12, and a cone head mantle liner 14. These are all conventional in construction. Cone head 10 includes a pair of wiper rings 16 and 18, which, as more clearly shown in FIG. 2, may be mounted to a corresponding pair of ridges, which might be called peripheral formations, 20 and 22. Peripheral formations 20 and 22 have a male configuration that complements a female configuration in the underside of wiper rings 16 and 18. The angle of the peripheral formations may be slightly greater than 90 degrees, such as 91 degrees, to ensure a sufficient contact area but to facilitate removal when desired. Adhesive may be used between wiper rings 16 and 18 and peripheral formations 20 and 22 but is not normally necessary or even advisable.

Figure 3:
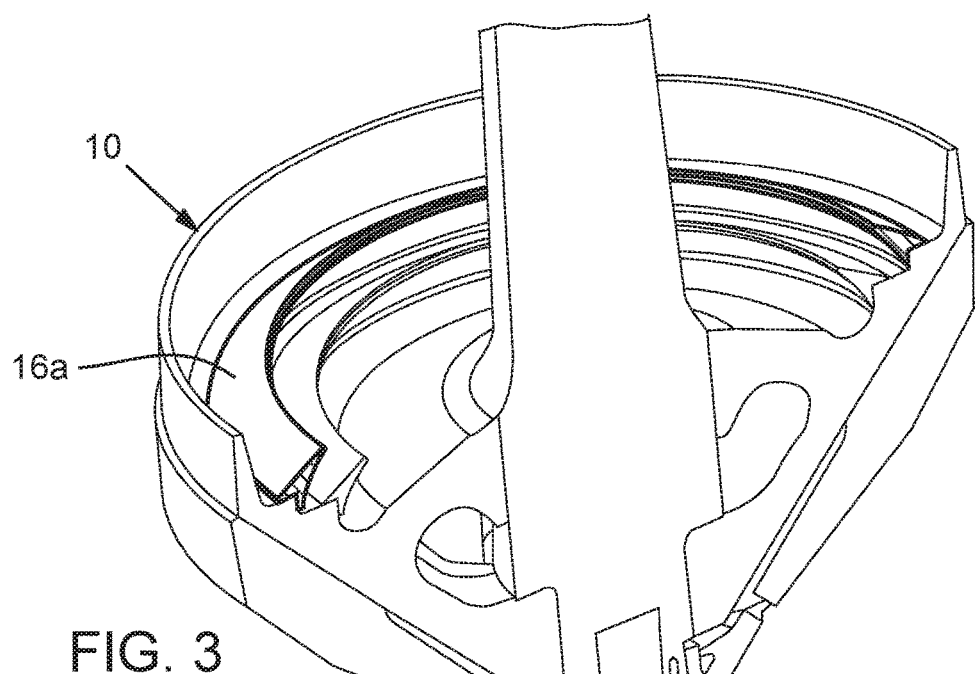
FIG. 3 is a perspective view showing how the wiper rings may be cut into two pieces for removal.

The processes of heating and cooling the wiper rings and cone head are described above. In the event the wiper rings need to be cut to be removed, FIG. 3 provides a schematic representation of how that might be done. As noted above and angle grinder and a thin cutting disc or other conventional cutting equipment might be utilized to cut each ring into two parts, here indicated at 16a and 16b. The same process might be followed if necessary in removing the inner wiper ring 18.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method for removably mounting at least one wiper ring to the underside of a cone head of a cone crusher, comprising the following steps in the order recited:
    inducing a temperature difference between the cone head and the at least one wiper ring;
    mounting the at least one wiper ring to an underside of the cone head while maintaining the temperature difference; and
    holding the at least one wiper ring against the underside of the cone head while the temperature difference dissipates.

2. A method for removably mounting at least one wiper ring to the underside of a cone head of a cone crusher, comprising the following steps in the order recited:
    cooling the at least one wiper ring;
    mounting the at least one wiper ring to an underside of the cone head while the at least one wiper ring is cool; and
    holding the at least one wiper ring against the underside of the cone head while the wiper ring warms to room temperature.

3. The method of claim 2, further comprising the initial step of selecting a cone head having at least one peripheral formation in the underside thereof that complements a configuration in an underside of the at least one wiper ring, and wherein the step of mounting the at least one wiper ring to the underside of the cone head comprises mounting the at least one wiper ring to the peripheral formation.

4. The method of claim 3, further comprising removing the at least one wiper ring by cutting the at least one wiper ring into at least two pieces and then prying the pieces from the cone head.

5. A method for removably mounting at least one wiper ring to the underside of a cone head of a cone crusher comprising the following steps in the order recited:
    heating the cone head;
    mounting the at least one wiper ring to the underside of the cone head, the wiper ring not having been heated; and
    holding the at least one wiper ring against the underside of the cone head while the cone head cools.

6. The method of claim 5 further comprising the initial step of selecting a cone head having at least one peripheral formation in the underside thereof, and wherein the step of mounting the at least one wiper ring to an underside of the cone head comprises mounting the at least one wiper ring to the peripheral formation.

7. The method of claim 6 wherein the step of selecting a cone head having at least one peripheral formation comprises selecting a cone head having at least one peripheral formation that extends around the entire circumference of the underside of the cone head.

8. The method of claim 5, further comprising the step of cutting the at least one wiper ring into at least two pieces and then prying the pieces from the cone head.

* * * * *